United States Patent
Cho

(10) Patent No.: US 11,485,307 B2
(45) Date of Patent: Nov. 1, 2022

(54) PEDESTRIAN PROTECTION APPARATUS AND CONTROL METHOD THEREOF

(71) Applicant: HYUNDAI MOBIS CO., LTD., Seoul (KR)

(72) Inventor: Woong Lae Cho, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 85 days.

(21) Appl. No.: 17/064,293

(22) Filed: Oct. 6, 2020

(65) Prior Publication Data
US 2021/0101549 A1 Apr. 8, 2021

(30) Foreign Application Priority Data
Oct. 7, 2019 (KR) .................. 10-2019-0123632

(51) Int. Cl.
| B60R 21/34 | (2011.01) |
| B60R 21/38 | (2011.01) |
| B60R 21/0134 | (2006.01) |
| B60R 21/36 | (2011.01) |

(52) U.S. Cl.
CPC .......... *B60R 21/0134* (2013.01); *B60R 21/34* (2013.01); *B60R 21/36* (2013.01); *B60R 21/38* (2013.01)

(58) Field of Classification Search
CPC ... B60R 21/013; B60R 21/0132; B60R 21/36; B60R 21/38; B60R 21/34
See application file for complete search history.

(56) References Cited

U.S. PATENT DOCUMENTS

| 7,630,806 | B2* | 12/2009 | Breed ................. B60R 21/0134 701/45 |
| 11,250,699 | B2* | 2/2022 | Malkes ..................... G08G 1/08 |
| 2014/0000974 | A1* | 1/2014 | Nilsson ................. B60R 21/015 180/274 |
| 2016/0152208 | A1* | 6/2016 | Ewert ................. B60R 21/0136 701/46 |
| 2018/0178745 | A1* | 6/2018 | Foltin ..................... B60R 21/34 |

(Continued)

FOREIGN PATENT DOCUMENTS

CN 103507738 A 1/2014

OTHER PUBLICATIONS

Office Action dated Jun. 30, 2022 in the corresponding Chinese Patent Application No. 202011056181.1.

*Primary Examiner* — Tan Q Nguyen
(74) *Attorney, Agent, or Firm* — NovoTechIP International PLLC

(57) ABSTRACT

A pedestrian protection apparatus may include: an active sensor configured to sense a forward obstacle of a vehicle; a passive sensor configured to sense a collision of the vehicle; a storage unit configured to store a collision threshold value which is set according to the passive sensor and a protection subject; a protection module driving unit configured to drive a protection module for protecting the protection subject in case of a collision with the vehicle; and a control unit configured to identify the protection subject based on the sensing result of the active sensor, adjust the collision threshold value according to the protection subject, compare the sensing result of the passive sensor to the collision threshold value, and operate the protection module driving unit.

8 Claims, 2 Drawing Sheets

(56) References Cited

U.S. PATENT DOCUMENTS

| | | | |
|---|---|---|---|
| 2019/0179323 A1* | 6/2019 | Ewert | B60Q 9/008 |
| 2019/0256027 A1* | 8/2019 | Reckziegel | B60R 21/0133 |
| 2020/0023884 A1* | 1/2020 | Mizoo | B62D 5/001 |
| 2020/0062202 A1* | 2/2020 | Umezawa | B60R 21/0132 |
| 2020/0324713 A1* | 10/2020 | Lee | H04N 5/2254 |

* cited by examiner

PEDESTRIAN PROTECTION APPARATUS AND CONTROL METHOD THEREOF

CROSS-REFERENCE TO RELATED APPLICATION

This application claims priority from and the benefit of Korean Patent Application No. 10-2019-0123632, filed on Oct. 7, 2019, which is hereby incorporated by reference for all purposes as if set forth herein.

BACKGROUND

Field

Exemplary embodiments of the present disclosure relate to a pedestrian protection apparatus and a control method thereof, and more particularly, to a pedestrian protection apparatus which can identify a pedestrian through an active sensor, predict whether a vehicle is likely to collide with the pedestrian, adjust an operation threshold value of a protection module through a passive sensor, and optimize an operation time of the protection module through the passive sensor when a collision occurs, thereby ensuring reliability, and a control method thereof.

Discussion of the Background

The safety act on pedestrian collision in Korea defines the HIC (Head Injury Criterion) when a secondary collision occurs, the secondary collision indicating that the head of a pedestrian collides with the bonnet of a vehicle after the vehicle collides with the pedestrian. According to head models of an adult and child, different structural collision characteristics are required.

According to the most important element among the collision characteristics, the HIC needs to have a regular value of 1,000 or less in the entire region, and the maximum deformation needs to be minimized in case of a collision in consideration of a packaging state within an engine room.

Thus, when the bonnet of a vehicle is designed, various aspects are considered, the various aspects including the stiffness of the bonnet, which is basically required due to the characteristics of the vehicle, the design of the bonnet for the elegant exterior of the vehicle, and an impact absorption function for coping with collision with a pedestrian.

With the development of vehicles, various convenience functions are developed. In particular, much attention is paid to the stability of a vehicle which protects a passenger in case of an accident such as collision. Thus, a safety system for improving the safety of a passenger through a prior action before the collision of the vehicle is being developed.

Recently, much attention has been paid to not only the safety of a driver who drives the vehicle but also the safety of a pedestrian who collides without protection equipment.

In particular, a pedestrian protection system is a device which can identify a pedestrian around the vehicle and protect the pedestrian in case of a collision.

The conventional pedestrian protection system identifies a pedestrian and object using information of passive sensors such as an acceleration sensor, a pressure sensor or an optical fabric sensor, and controls a protection apparatus (e.g. a hood lift, an airbag or a containment device) to protect a pedestrian who collides with the vehicle, in case of the collision.

However, due to the characteristics of physical quantities (e.g. acceleration and pressure) sensed by the passive sensors, the discrimination between a pedestrian and a specific object (e.g. tree or telephone pole) may be reduced. In this case, even when the vehicle collides with the specific object, not the pedestrian, the protection apparatus (e.g. a hood lift or airbag) may be operated.

Furthermore, in case of a collision with the pedestrian, the pedestrian protection system is operated as the collision is sensed through an airbag sensor within the vehicle and a front collision sensor, a pressure sensor and an optical fabric sensor outside the vehicle.

The front collision sensor, the pressure sensor and the optical fabric sensor may be mounted on the front surface of the vehicle, and sense a collision with a pedestrian ahead of the vehicle. However, the current structure has a disadvantage in that, since a collision signal for a collision with a low impulse is sensed as a weak signal as in a pedestrian test, the point of time that the pedestrian protection system is operated is delayed, or the pedestrian protection system is not operated.

Therefore, in order to solve such a problem, a bump back beam mounted at the front of the vehicle and a plurality of sensors mounted on a bump skin are used to determine a collision with a pedestrian through an X-axis signal of the vehicle. In this method, however, the cost is increased because the plurality of sensors are used, or it is difficult to identify a pedestrian because only passive sensor signals are used. Thus, the pedestrian protection system may malfunction or not be operated, or TTF (Time To Fire) may be delayed.

SUMMARY

Various embodiments are directed to a pedestrian protection apparatus which can identify a pedestrian through an active sensor, predict whether a vehicle is likely to collide with the pedestrian, adjust an operation threshold value of a protection module through a passive sensor, and optimize an operation time of the protection module through the passive sensor when a collision occurs, thereby ensuring reliability, and a control method thereof.

In an embodiment, a pedestrian protection apparatus may include: an active sensor configured to sense a forward obstacle of a vehicle; a passive sensor configured to sense a collision of the vehicle; a storage unit configured to store a collision threshold value which is set according to the passive sensor and a protection subject; a protection module driving unit configured to drive a protection module for protecting the protection subject in case of a collision with the vehicle; and a control unit configured to identify the protection subject based on the sensing result of the active sensor, adjust the collision threshold value according to the protection subject, compare the sensing result of the passive sensor to the collision threshold value, and operate the protection module driving unit.

The active sensor may include any one or more of a camera and a radar.

The passive sensor may include any one or more of an acceleration sensor and a pressure sensor.

The control unit may determine whether the vehicle is likely to collide with the protection subject, based on the sensing result of the active sensor, a longitudinal relative distance, a longitudinal collision time, a longitudinal relative velocity and a lateral relative distance.

The control unit may adjust the collision threshold value such that the time to operate the protection module driving unit is advanced according to the protection subject.

The plurality of passive sensors are provided, the control unit may independently compare the sensing results of the passive sensors to the collision threshold values, respectively, and operate the protection module driving unit.

In an embodiment, a control method of a pedestrian protection apparatus may include: identifying, by a control unit, a protection subject based on a sensing result of an active sensor; determining, by the control unit, whether a vehicle is likely to collide with the protection subject, according to the identification result; adjusting, by the control unit, a collision threshold value according to the determination result; comparing, by the control unit, a sensing result of a passive sensor to the collision threshold value; and operating, by the control unit, a protection module driving unit according to the comparison result of the collision threshold value.

In the determining of whether the vehicle is likely to collide with the protection subject, the control unit may determine whether the vehicle is likely to collide with the protection subject, based on the sensing result of the active sensor, a longitudinal relative distance, a longitudinal collision time, a longitudinal relative velocity and a lateral relative distance.

In the adjusting of the collision threshold value, the control unit may adjust the collision threshold value such that the time to operate the protection module driving unit is advanced according to the protection subject.

In the operating of the protection module driving unit, the control unit may independently compare sensing results inputted from the plurality of passive sensors to the collision threshold values, respectively, and operate the protection module driving unit.

In accordance with the embodiments of the present disclosure, the pedestrian protection apparatus and the control method of the pedestrian protection apparatus in accordance with the embodiment of the present disclosure may identify a pedestrian through the active sensor, predict whether a vehicle is likely to collide with the pedestrian, and adjust the operation threshold value of the protection module by the passive sensor. When the collision occurs, the pedestrian protection apparatus and the control method may optimize the operation time of the protection module through the passive sensor, and prevent a situation in which the protection apparatus malfunctions or is not operated, thereby securing the reliability but also reducing damage to the protection subject.

DETAILED DESCRIPTION OF THE ILLUSTRATED EMBODIMENTS

Figure 1:
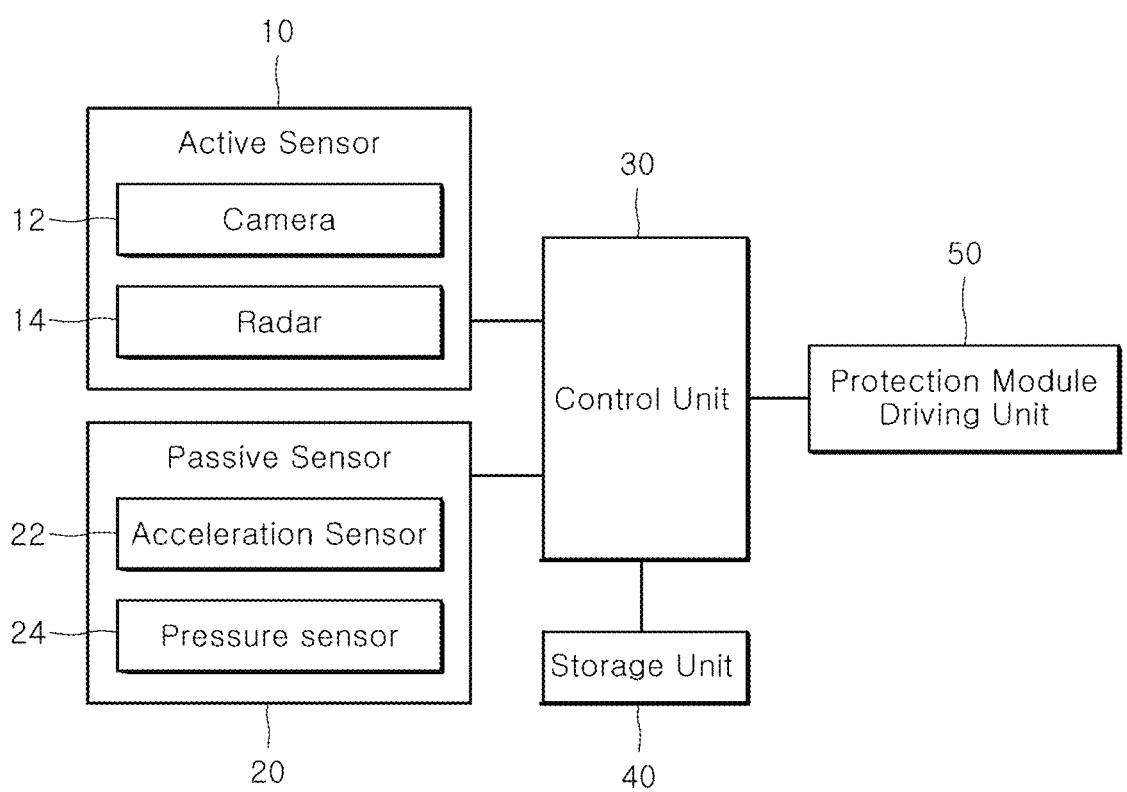
FIG. 1 is a block configuration diagram illustrating a pedestrian protection apparatus in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a pedestrian protection apparatus and a control method thereof will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a block configuration diagram illustrating a pedestrian protection apparatus in accordance with an embodiment of the present disclosure.

As illustrated in FIG. 1, the pedestrian protection apparatus in accordance with the embodiment of the present disclosure may include an active sensor 10, a passive sensor 20, a storage unit 40, a protection module driving unit 50 and a control unit 30.

The active sensor 10 may identify a forward obstacle by sensing whether the forward obstacle is present ahead of the vehicle and the distance from the forward obstacle, and provide a sensing result to the control unit 30 to determine whether the vehicle is likely to collide with the forward obstacle.

The active sensor 10 may include one or more of a camera 12 and a radar 14. In addition to the camera 12 and the radar 14, the active sensor 10 may include sensors which can identify a forward obstacle and sense the distance from the forward obstacle, in order to determine whether the vehicle is likely to collide with the forward obstacle.

The passive sensor 20 may sense a collision of the vehicle, provide the sensing result to the control unit 30, and drive a protection module (not illustrated).

The passive sensor 20 for sensing a physical contact state may include one or more of an acceleration sensor 22 and a pressure sensor 24. In addition to the acceleration sensor 22 and the pressure sensor 24, the passive sensor 20 may include sensors capable of sensing a physical contact state with the vehicle.

The storage unit 40 may store collision threshold values for a collision with a protection subject, according to the types of the respective passive sensors 20. Therefore, the sensing result inputted from the passive sensor 20 and the corresponding collision threshold value may be compared to operate the protection module.

The protection subject may include a pedestrian and a cyclist.

The protection module driving unit 50 may drive the protection module for protecting the protection subject in case of a collision with the vehicle.

The protection module may include any one or more of a hood lift and a pedestrian airbag.

The control unit 30 may identify the protection subject based on the sensing result of the active sensor 10, adjust the collision threshold value for the protection subject, compare the sensing result of the passive sensor 20 with the collision threshold value, and operate the protection module driving unit 50.

That is, the control unit 30 may identify an obstacle (e.g. a pedestrian, a cyclist, a truck or a car) based on the sensing result of the active sensor 10, and determine whether the vehicle is likely to collide with the protection subject, based on a longitudinal relative distance, a longitudinal collision time, a longitudinal relative velocity and a lateral relative distance, when the obstacle is a pedestrian or cyclist who is the protection subject.

Based on the type of the obstacle, a longitudinal collision risk and lateral information, the control unit 30 may determine an overlap amount between the vehicle and the obstacle, and determine whether the vehicle is likely to collide with the protection subject.

Then, when determining that the vehicle is likely to collide with the protection subject, the control unit 30 may adjust the collision threshold value for the passive sensor 20, stored in the storage unit 40, such that the time to operate the protection module driving unit 50 is advanced according to the protection subject.

Therefore, the control unit 30 may compare the sensing result of the passive sensor 20 to the collision threshold value, and drive the protection module, thereby not only preventing a situation in which the protection apparatus is not operated or malfunctions, but also reducing damage to the pedestrian or cyclist due to the collision.

When the plurality of passive sensors 20 are provided, the control unit 30 may independently compare the sensing results of the passive sensors 20 to the collision threshold values, respectively, and operate the protection module driving unit 50. Thus, even when any one passive sensor 20 is distorted, the control unit 30 may stably drive the protection module, thereby securing the robustness of the pedestrian protection apparatus.

As described above, the pedestrian protection apparatus in accordance with the embodiment of the present disclosure may identify a pedestrian through the active sensor, predict whether a vehicle is likely to collide with the pedestrian, and then adjust the operation threshold value of the protection module by the passive sensor. When a collision occurs, the pedestrian protection apparatus may optimize the operation time of the protection module through the passive sensor, and prevent a situation in which the protection apparatus malfunctions or is not operated, thereby securing the reliability but also reducing damage to the protection subject.

Figure 2:
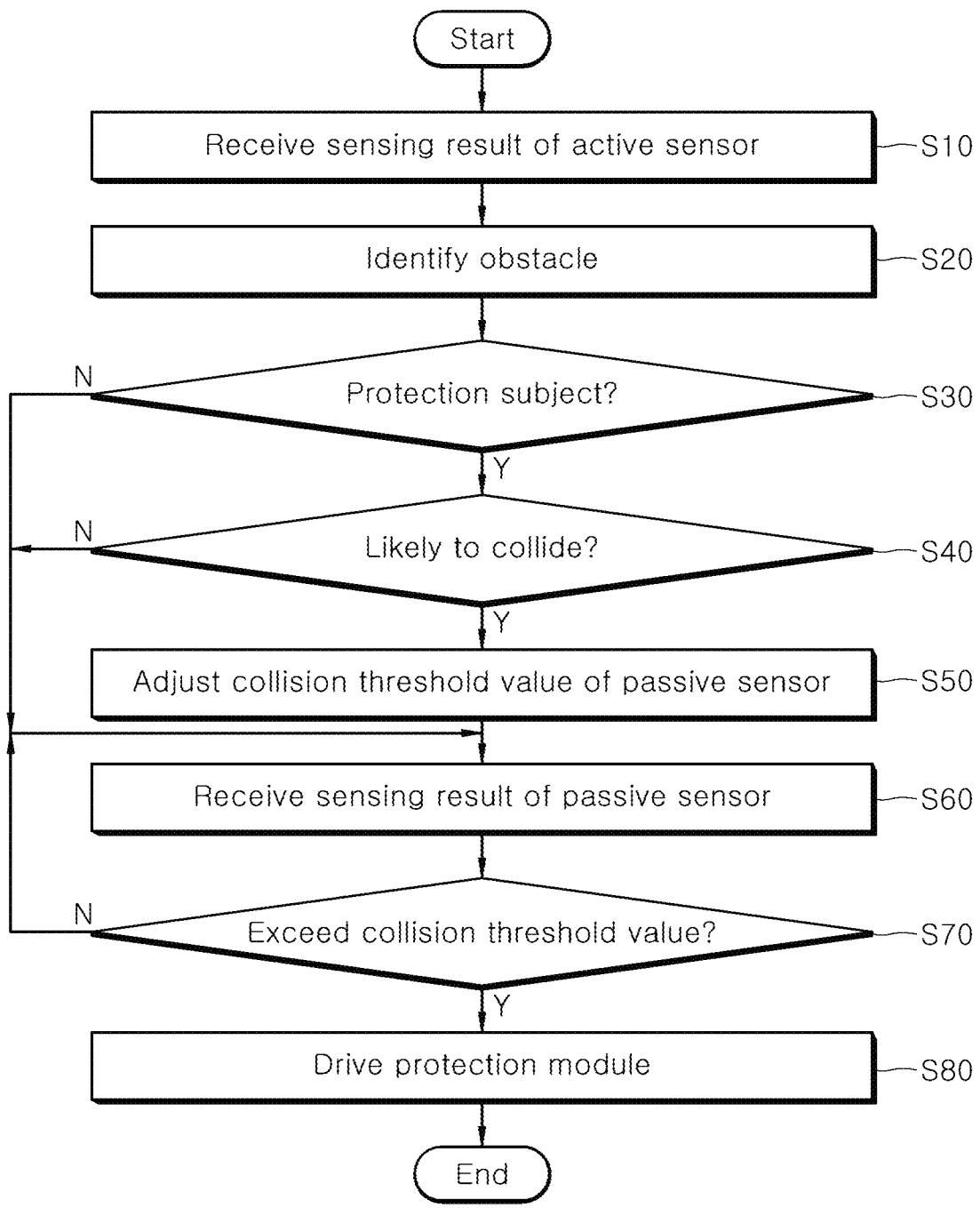
FIG. 2 is a flowchart for describing a control method of a pedestrian protection apparatus in accordance with an embodiment of the present disclosure.

FIG. 2 is a flowchart for describing a control method of a pedestrian protection apparatus in accordance with an embodiment of the present disclosure.

As illustrated in FIG. 2, the control method of the pedestrian protection apparatus in accordance with the embodiment of the present disclosure starts with step S10 in which the control unit 30 receives a sensing result from the active sensor 10.

The active sensor 10 may include one or more of a camera 12 and a radar 14. In addition to the camera 12 and the radar 14, the active sensor 10 may include sensors which can identify a forward obstacle and sense the distance from the forward obstacle, in order to determine whether a vehicle is likely to collide with a pedestrian.

After receiving the sensing result of the active sensor 10 in step S10, the control unit 30 identifies whether the type of the obstacle is a pedestrian, a cyclist, a truck or a car, based on the sensing result of the active sensor 10, in step S20.

After identifying the obstacle in step S20, the control unit 30 determines whether the type of the obstacle is the protection subject who is a pedestrian or cyclist, in step S30.

When it is determined in step S30 that the obstacle is not the protection subject, the control unit 30 receives the sensing result from the passive sensor 20 in step S60.

On the other hand, when it is determined in step S30 that the obstacle is a protection subject, the control unit 30 determines whether the vehicle is likely to collide with the protection subject, in step S40.

When the sensing result of the active sensor 10 indicates that the obstacle is a pedestrian or cyclist who is the protection subject, the control unit 30 may determine whether the vehicle is likely to collide with the protection subject, based on a longitudinal relative distance, a longitudinal collision time, a longitudinal relative velocity and a lateral relative distance.

Based on the type of the obstacle, a longitudinal collision risk and lateral information, the control unit 30 may determine an overlap amount between the vehicle and the obstacle, and determine whether the vehicle is likely to collide with the protection subject.

When it is determined in step S40 that the vehicle is unlikely to collide with the protection subject, the control unit 30 receives the sensing result from the passive sensor 20 in step S60.

On the contrary, when it is determined in step S40 that the vehicle is likely to collide with the protection subject, the control unit 30 adjusts the collision threshold value for the passive sensor 20, stored in the storage unit 40, such that the time to operate the protection module driving unit 50 is advanced according to the protection subject, in step S50.

Then, the control unit 30 receives the sensing result from the passive sensor 20 in step S60.

After receiving the sensing result of the passive sensor 20 in step S60, the control unit 30 compares the sensing result of the passive sensor 20 to the collision threshold value of the passive sensor 20, and determines whether the sensing result of the passive sensor 20 exceeds the collision threshold value, in step S70.

The collision threshold values of the respective passive sensors 20 may be collision threshold values stored in the storage unit 40 or collision threshold values which are adjusted based on the sensing result of the active sensor 10.

When it is determined in step S70 that the sensing result of the passive sensor 20 does not exceed the collision threshold value, the control unit 30 returns to step S60, and continuously receives the sensing result from the passive sensor 20 to determine whether a collision occurs.

On the other hand, when it is determined in step S70 that the sensing result of the passive sensor 20 exceeds the collision threshold value, the control unit 30 operates the protection module driving unit 50 to drive the protection module in step S80.

When the sensing results are inputted from the plurality of passive sensors 20, the control unit 30 may independently compare the sensing results of the passive sensors 20 to the collision threshold values, respectively, and operate the protection module driving unit 50. Thus, even when any one passive sensor 20 is distorted, the control unit 30 may stably drive the protection module, thereby securing the robustness of the pedestrian protection apparatus.

As described above, the control method of the pedestrian protection apparatus in accordance with the embodiment of the present disclosure may identify a pedestrian through the active sensor, predict whether a vehicle is likely to collide with the pedestrian, and adjust the operation threshold value of the protection module by the passive sensor. When the collision occurs, the control method may optimize the operation time of the protection module through the passive sensor, and prevent a situation in which the protection apparatus malfunctions or is not operated, thereby securing the reliability but also reducing damage to the protection subject.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor includes a communication device, such as a computer, a cell phone, a PDA (Personal Digital Assistant) or another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for protecting a protection subject, comprising:
   a first sensor configured to sense a forward obstacle positioned in front of a vehicle, the vehicle including a protection module configured to protect a protection subject when the vehicle collides with the protection subject;
   a second sensor configured to detect a collision of the vehicle; and
   a control unit configured to:
      receive, from the first sensor, first sensing data indicative of the sensed forward obstacle;
      determine, based on the received first sensing data, whether the sensed forward obstacle is the protection subject;
      in response to determining that the sensed forward obstacle is not the protection subject, perform:
         receiving, from the second sensor, second sensing data indicative of whether the vehicle is likely to collide with the projection subject;
         determining whether a first detection value representing the second sensing data exceeds a collision threshold value; and
         in response to determining that the first detection value exceeds the collision threshold value, activating the protection module; and
      in response to determining that the sensed forward obstacle is the protection subject, perform:
         determine, based on at least one of a distance between the vehicle and the protection subject, a collision time and a velocity of the vehicle, whether the vehicle is likely to collide with the projection subject;
         in response to determining that the vehicle is likely to collide with the projection subject, adjusting the collision threshold value to reduce a time to activate the protection module;
         upon adjusting the collision threshold value, receiving, from the second sensor, the second sensing data indicative of whether the vehicle is likely to collide with the projection subject;
         determining whether a second detection value representing the second sensing data exceeds the adjusted collision threshold value; and
         in response to determining that the second detection value exceeds the adjusted collision threshold value, activating the protection module.

2. The apparatus of claim 1, wherein the first sensor comprises a camera or a radar unit.

3. The apparatus of claim 1, wherein the second sensor comprises an acceleration sensor or a pressure sensor.

4. The apparatus of claim 1, wherein, in response to determining that the detected sensed forward obstacle is the protection subject, the control unit is further configured to determine whether the vehicle is likely to collide with the protection subject further based on the received first sensing data.

5. The apparatus of claim 1, wherein:
   the second sensor comprises a plurality of passive sensors, and
   for determining whether the second detection value exceeds the adjusted collision threshold value, the control unit is configured to compare individually the detection value of each passive sensor to the adjusted collision threshold value.

6. A method of operating a system for protecting a protection subject, the system comprising (1) a first sensor configured to sense a forward obstacle positioned in front of a vehicle and (2) a second sensor configured to detect a collision of the vehicle, the vehicle comprising a protection module configured to protect a protection subject when the vehicle collides with the protection subject, the method comprising:
   receiving, from the first sensor, first sensing data indicative of the sensed forward obstacle;
   determining, based on the received first sensing data, whether the sensed forward obstacle is the protection subject;
   in response to determining that the sensed forward obstacle is not the protection subject, performing:
      receiving, from the second sensor, second sensing data indicative of whether the vehicle is likely to collide with the projection subject;
      determining whether a first detection value representing the second sensing data exceeds a collision threshold value; and
      in response to determining that the first detection value exceeds the collision threshold value, activating the protection module; and
   in response to determining that the sensed forward obstacle is the protection subject, performing:
      determine, based on at least one of a distance between the vehicle and the protection subject, a collision time and a velocity of the vehicle, whether the vehicle is likely to collide with the projection subject;

in response to determining that the vehicle is likely to collide with the projection subject, adjusting the collision threshold value to reduce a time to activate the protection module;

upon adjusting the collision threshold value, receiving, from the second sensor, the second sensing data indicative of whether the vehicle is likely to collide with the projection subject;

determining whether a second detection value representing the second sensing data exceeds the adjusted collision threshold value; and in response to determining that the second detection value exceeds the adjusted collision threshold value, activating the protection module.

7. The method of claim 6, wherein whether the vehicle is likely to collide with the protection subject is determined further based on the received first sensing data.

8. The method of claim 6, wherein:

the second sensor comprises a plurality of passive sensors, and determining whether the second detection value exceeds the adjusted collision threshold value comprises comparing the second detection value of each passive sensor to the adjusted collision threshold value.

\* \* \* \* \*